(12) United States Patent  
Gschwind et al.

(10) Patent No.: US 9,354,888 B2
(45) Date of Patent: May 31, 2016

(54) PERFORMING PREDECODE-TIME OPTIMIZED INSTRUCTIONS IN CONJUNCTION WITH PREDECODE TIME OPTIMIZED INSTRUCTION SEQUENCE CACHING

(75) Inventors: Michael K. Gschwind, Chappaqua, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1067 days.

(21) Appl. No.: 13/432,357

(22) Filed: Mar. 28, 2012

(65) Prior Publication Data

US 2013/0262821 A1    Oct. 3, 2013

(51) Int. Cl.
*G06F 9/38* (2006.01)
*G06F 9/30* (2006.01)

(52) U.S. Cl.
CPC ............. *G06F 9/382* (2013.01); *G06F 9/3017* (2013.01); *G06F 9/384* (2013.01); *G06F 9/3808* (2013.01)

(58) Field of Classification Search
CPC ..... G06F 9/382; G06F 9/3017; G06F 9/3808; G06F 9/30181
See application file for complete search history.

(56) References Cited

U.S. PATENT DOCUMENTS

| | | | |
|---|---|---|---|
| 5,459,844 A | * | 10/1995 | Eickemeyer ............ G06F 9/382 712/213 |
| 6,189,088 B1 | | 2/2001 | Gschwind |
| 6,314,511 B2 | | 11/2001 | Levy et al. |
| 2009/0172314 A1 | | 7/2009 | Gabor |
| 2011/0087865 A1 | | 4/2011 | Barrick et al. |
| 2013/0262821 A1 | | 10/2013 | Gschwind et al. |

FOREIGN PATENT DOCUMENTS

| | | |
|---|---|---|
| CN | 101432692 A | 5/2009 |
| CN | 101646999 A | 2/2010 |
| DE | 102013205059 A1 | 10/2013 |

OTHER PUBLICATIONS

Friendly et al., "Putting the Fill Unit to Work: Dynamic Optimizations for Trace Cache Microprocessors"; IEEE; 1998.*

(Continued)

*Primary Examiner* — Benjamin Geib
(74) *Attorney, Agent, or Firm* — Cantor Colburn LLP; William A. Kinnaman, Jr.

(57) ABSTRACT

A method for performing predecode-time optimized instructions in conjunction with predecode time optimized instruction sequence caching. The method includes receiving a first instruction of an instruction sequence and a second instruction of the instruction sequence and determining if the first instruction and the second instruction can be optimized. In response to the determining that the first instruction and second instruction can be optimized, the method includes, preforming a pre-decode optimization on the instruction sequence and generating a new second instruction, wherein the new second instruction is not dependent on a target operand of the first instruction and storing a pre-decoded first instruction and a pre-decoded new second instruction in an instruction cache. In response to determining that the first instruction and second instruction can not be optimized, the method includes, storing the pre-decoded first instruction and a pre-decoded second instruction in the instruction cache.

3 Claims, 7 Drawing Sheets

(56) References Cited

OTHER PUBLICATIONS

Gu, Ji et al., "Enabling Large Decoded Instruction Loop Caching for Energy-Aware Embedded Processors", CASES '10 Proceedings of the 2010 internatinal conference on Compilers, architectures and synthesis for embedded systems; publisher: ACM, Oct. 24-29, 2010, pp. 247-256.

Rawlins et al., "Lightweight Runtime Control Flow Analysis for Adaptive Loop Caching", GLSVLSI '10 Proceedings of the 20th symposium on Great Lakes Symposium on VLSI, publisher: ACM, May 16-18, 2010, 6 pages.

Gschwind, et al., Unpublished U.S. Appl. No. 13/251,409, filed Oct. 3, 2011; Group Art Unit 2183; Confirmation No. 1421.

\* cited by examiner

PERFORMING PREDECODE-TIME OPTIMIZED INSTRUCTIONS IN CONJUNCTION WITH PREDECODE TIME OPTIMIZED INSTRUCTION SEQUENCE CACHING

BACKGROUND

The present invention relates to the field of computer processors, and more particularly, to performing predecode-time optimized instructions in conjunction with predecode time optimized instruction sequence caching.

An Out of Order (OoO) processor typically contains multiple execution pipelines that may execute instructions in a different order than what the program sequence (or "program order") specifies in order to maximize the average instruction per cycle rate by reducing data dependencies and maximizing utilization of the execution pipelines allocated for various instruction types. Results of instruction execution are typically held temporarily in physical registers of one or more register files of limited depth. An OoO processor typically employs register renaming to avoid unnecessary serialization of instructions due to the reuse of a given architected register by subsequent instructions in the program order.

Various methods and systems have been developed for decoding and optimizing instructions for execution by an OoO processor. However, decoding instructions and performing additional decode time instruction optimization can cause an increase in the power consumption and heat dissipation of a microprocessor. In addition, decoding instructions and performing additional decode time instruction optimization can also require the introduction of additional pipeline stages into a microprocessor.

In instances where a series of instructions are required to be executed repeatedly, such as with a program loop or recursive function, current methods for decoding instructions and performing additional decode time instruction optimization preform decoding and optimization operations repeatedly prior to execution of the instructions. This repetition of decoding and optimization for the same serious of instructions causes unnecessary power and heat dissipation, and execution delay due to the optimizations being performed.

SUMMARY

Embodiments of the disclosure include a computer program product for performing predecode-time optimized instructions in conjunction with predecode time optimized instruction sequence caching. The computer program product includes a storage medium readable by a processing circuit and storing instructions for execution by the processing circuit for performing a method. The method includes receiving a first instruction of an instruction sequence and a second instruction of the instruction sequence and determining if the first instruction and the second instruction can be optimized. In response to the determining that the first instruction and second instruction can be optimized, the method includes, preforming a pre-decode optimization on the instruction sequence and generating a new second instruction, wherein the new second instruction is not dependent on a target operand of the first instruction and storing a pre-decoded first instruction and a pre-decoded new second instruction in an instruction cache. In response to determining that the first instruction and second instruction can not be optimized, the method includes, storing the pre-decoded first instruction and a pre-decoded second instruction in the instruction cache.

Embodiments of the disclosure also include a system for performing predecode-time optimized instructions in conjunction with predecode time optimized instruction sequence caching. The system includes a processor configured to communicate with a main storage, the processor comprising an instruction fetcher, an instruction modifier, an instruction cache and one or more execution units, the processor configured to perform a method. The method includes receiving a first instruction of an instruction sequence and a second instruction of the instruction sequence and determining if the first instruction and the second instruction can be optimized. In response to the determining that the first instruction and second instruction can be optimized, the method includes, preforming a pre-decode optimization on the instruction sequence and generating a new second instruction, wherein the new second instruction is not dependent on a target operand of the first instruction and storing a pre-decoded first instruction and a pre-decoded new second instruction in an instruction cache. In response to determining that the first instruction and second instruction can not be optimized, the method includes, storing the pre-decoded first instruction and a pre-decoded second instruction in the instruction cache.

Embodiments of the disclosure further include a method for performing predecode-time optimized instructions in conjunction with predecode time optimized instruction sequence caching. The method includes receiving a first instruction of an instruction sequence and a second instruction of the instruction sequence and determining if the first instruction and the second instruction can be optimized. In response to the determining that the first instruction and second instruction can be optimized, the method includes, preforming a pre-decode optimization on the instruction sequence and generating a new second instruction, wherein the new second instruction is not dependent on a target operand of the first instruction and storing a pre-decoded first instruction and a pre-decoded new second instruction in an instruction cache. In response to determining that the first instruction and second instruction can not be optimized, the method includes, storing the pre-decoded first instruction and a pre-decoded second instruction in the instruction cache.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with an exemplary embodiment, a microprocessor instruction predecode logic captures a stream, or series, of instructions and decodes and performing optimizations on the series of instructions. The decoded and optimized instruction sequence is then stored directly in the instruction cache. By storing the decoded and optimized instructions in the instruction cache the cost with respect to power and performance associated with repeatedly performing decode time instruction optimization can be avoided. For example, in some cases such as loops or in recursive functions a single instruction sequence can be executed repeatedly. By pre-decoding and optimizing the instruction sequence and storing the results in an instruction cache, the process no longer is required to decode and optimize the instruction sequence each time the instruction sequence is executed.

Figure 1:
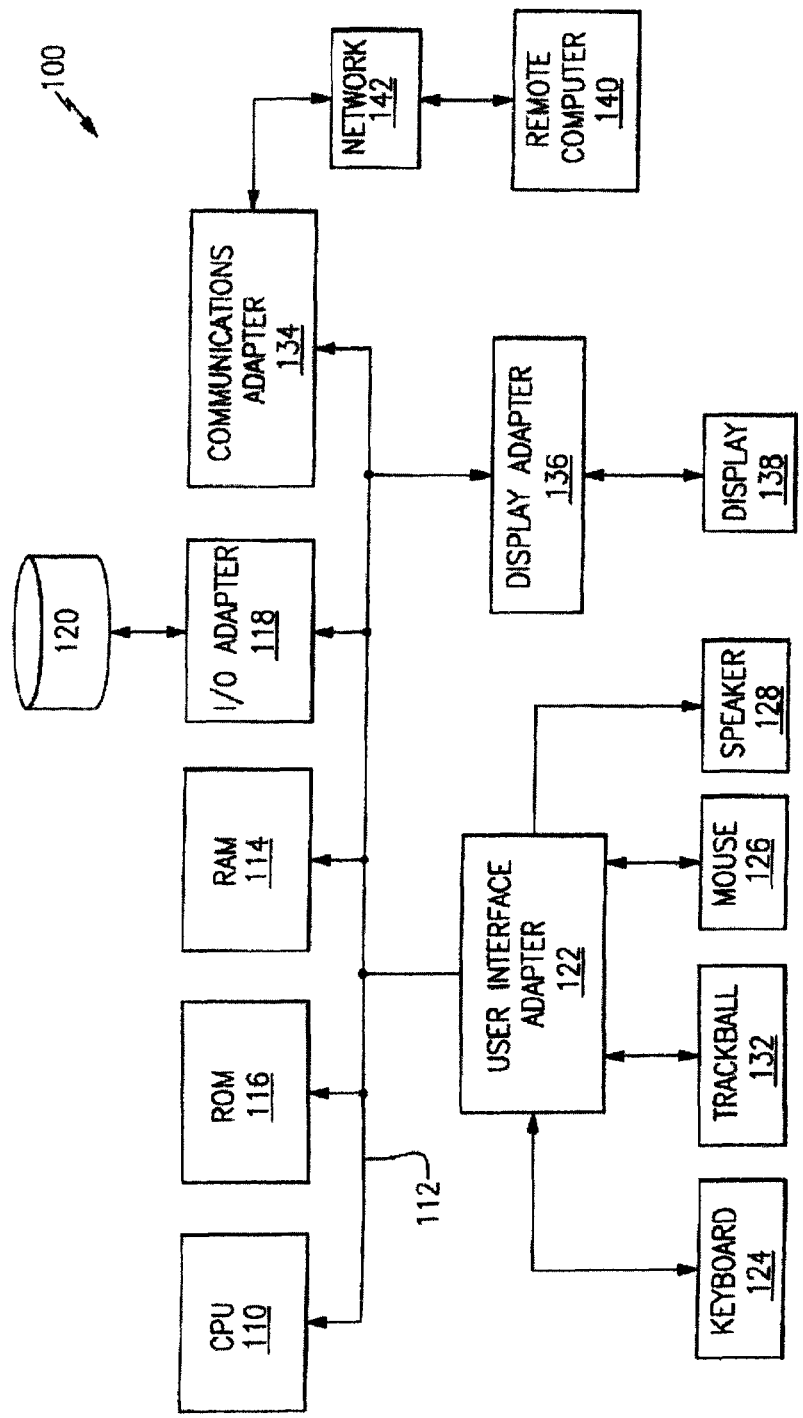
FIG. 1 illustrates a block diagram of an exemplary system configuration for use with the teachings herein.

With reference now to the figures, and in particular to FIG. 1, an example is shown of a data processing system 100 which may include an OoO processor employing an intermediate register mapper as described below with reference to FIG. 2. As shown in FIG. 1, data processing system 100 has a central processing unit (CPU) 110, which may be implemented with processor 200 of FIG. 2. CPU 110 is coupled to various other components by an interconnect 112. Read only memory ("ROM") 116 is coupled to the interconnect 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a storage device 120. Communications adapter 134 interfaces interconnect 112 with network 140, which enables data processing system 100 to communicate with other such systems, such as remote computer 142. Input/Output devices are also connected to interconnect 112 via user interface adapter 122 and display adapter 136. Keyboard 124, track ball 132, mouse 126 and speaker 128 are all interconnected to bus 112 via user interface adapter 122. Display 138 is connected to system bus 112 by display adapter 136. In this manner, data processing system 100 receives input, for example, throughout keyboard 124, trackball 132, and/or mouse 126 and provides output, for example, via network 142, on storage device 120, speaker 128 and/or display 138. The hardware elements depicted in data processing system 100 are not intended to be exhaustive, but rather represent principal components of a data processing system in one embodiment.

Operation of data processing system 100 can be controlled by program code, such as firmware and/or software, which typically includes, for example, an operating system such as AIX® ("AIX" is a trademark of the IBM Corporation) and one or more application or middleware programs. Such program code comprises instructions discussed below with reference to FIG. 2.

Figure 2:
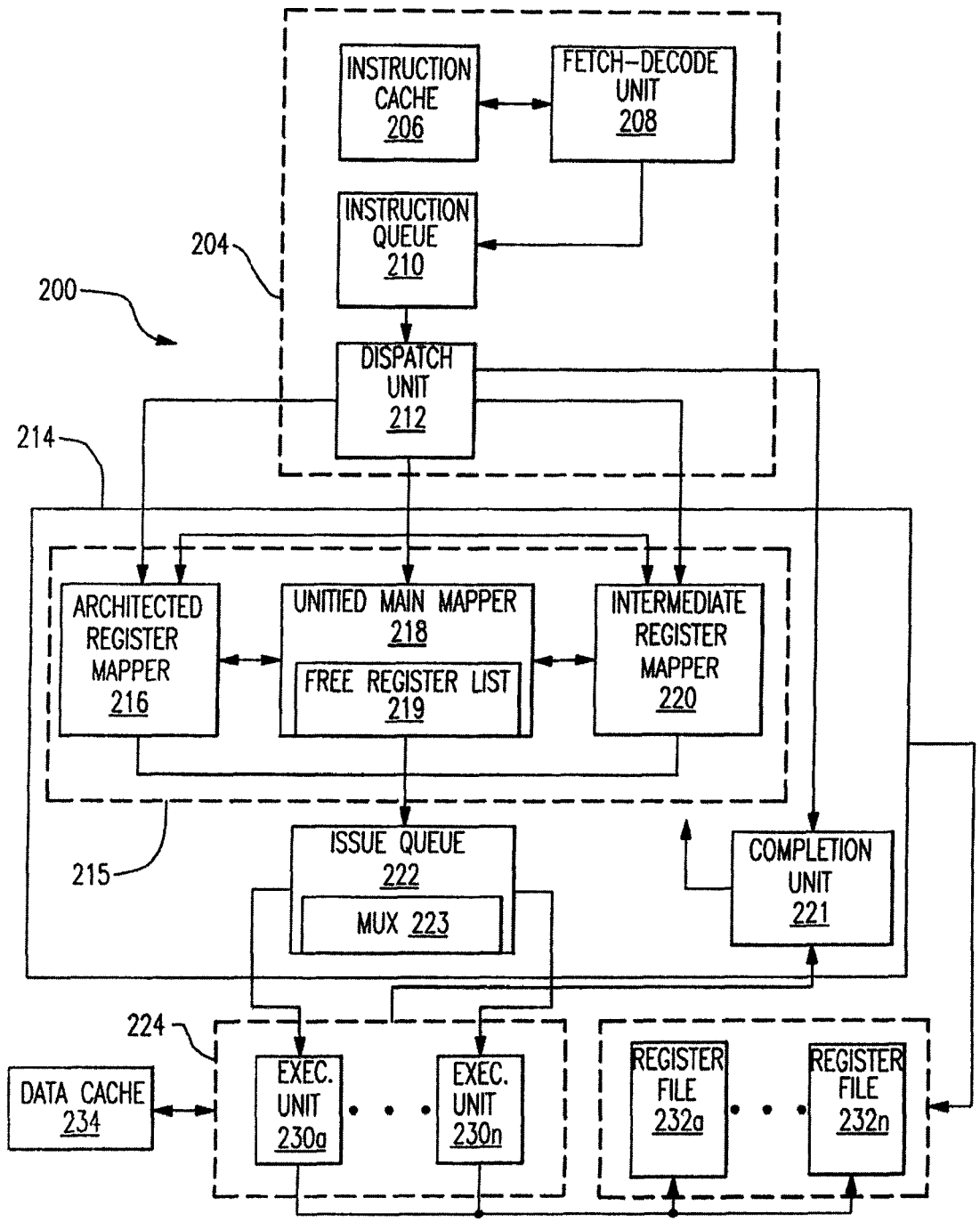
FIG. 2 illustrates a block diagram of an exemplary processor configuration for use with the teachings herein.

Referring now to FIG. 2, a block diagram of an exemplary processor 200 for use with the teaching herein is depicted. Instructions are retrieved from memory (e.g., RAM 114 of FIG. 1) and loaded into instruction sequencing logic (ISL) 204, which includes Level 1 Instruction cache (L1 I-cache) 206, fetch-decode unit 208, instruction queue 210 and dispatch unit 212. Specifically, the instructions are loaded in L1 I-cache 206 of ISL 204. The instructions are retained in L1 I-cache 206 until they are required, or replaced if they are not needed. Instructions are retrieved from L1 I-cache 206 and decoded by fetch-decode unit 208. After decoding a current instruction, the current instruction is loaded into instruction queue 210. Dispatch unit 212 dispatches instructions from instruction queue 210 into register management unit 214, as well as completion unit 221. Completion unit 221 is coupled to general execution unit 224 and register management unit 214, and monitors when an issued instruction has completed.

When dispatch unit 212 dispatches a current instruction, unified main mapper 218 of register management unit 214 allocates and maps a destination logical register number to a physical register within physical register files 232*a*-232*n* that is not currently assigned to a logical register. The destination is said to be renamed to the designated physical register among physical register files 232*a*-232*n*. Unified main mapper 218 removes the assigned physical register from a list 219 of free physical registers stored within unified main mapper 218. All subsequent references to that destination logical register will point to the same physical register until fetch-decode unit 208 decodes another instruction that writes to the same logical register. Then, unified main mapper 218 renames the logical register to a different physical location selected from free list 219, and the mapper is updated to enter the new logical-to-physical register mapper data. When the logical-to-physical register mapper data is no longer needed, the physical registers of old mappings are returned to free list 219. If free physical register list 219 does not have enough physical registers, dispatch unit 212 suspends instruction dispatch until the needed physical registers become available.

After the register management unit 214 has mapped the current instruction, issue queue 222 issues the current instruction to general execution engine 224, which includes execution units (EUs) 230*a*-230*n*. Execution units 230*a*-230*n* are of various types, such as floating-point (FP), fixed-point (FX), and load/store (LS). General execution engine 224 exchanges data with data memory (e.g. RAM 114, ROM 116 of FIG. 1) via a data cache 234. Moreover, issue queue 222 may contain instructions of FP type, FX type, and LS instructions. However, it should be appreciated that any number and types of instructions can be used. During execution. EUs 230*a*-230*n* obtain the source operand values from physical locations in register file 232*a*-232*n* and store result data, if any, in register files 232*a*-232*n* and/or data cache 234.

Still referring to FIG. 2, register management unit 214 includes: (i) mapper cluster 215, which includes architected register mapper 216, unified main mapper 218, intermediate register mapper 220, and (ii) issue queue 222. Mapper cluster 215 tracks the physical registers assigned to the logical registers of various instructions. In an exemplary embodiment, architected register mapper 216 has 16 logical (i.e., not physically mapped) registers of each type that store the last, valid (i.e., checkpointed) state of logical-to-physical register mapper data. However, it should be recognized that different processor architectures can have more or less logical registers, as described in the exemplary embodiment. Architected register mapper 216 includes a pointer list that identifies a physical register which describes the checkpointed state. Physical register files 232*a*-232*n* will typically contain more registers than the number of entries in architected register mapper 216. It should be noted that the particular number of physical and logical registers that are used in a renaming mapping scheme can vary.

In contrast, unified main mapper 218 is typically larger (typically contains up to 20 entries) than architected register mapper 216. Unified main mapper 218 facilitates tracking of the transient state of logical-to-physical register mappings. The term "transient" refers to the fact that unified main mapper 218 keeps track of tentative logical-to-physical register mapping data as the instructions are executed out-of-order. OoO execution typically occurs when there are older instructions which would take longer (i.e., make use of more clock cycles) to execute than newer instructions in the pipeline. However, should an OoO instruction's executed result require that it be flushed for a particular reason (e.g., a branch misprediction), the processor can revert to the check-pointed state maintained by architected register mapper 216 and resume execution from the last, valid state.

Unified main mapper 218 makes the association between physical registers in physical register files 232a-232n and architected register mapper 216. The qualifying term "unified" refers to the fact that unified main mapper 218 obviates the complexity of custom-designing a dedicated mapper for each of register files 232 (e.g., general-purpose registers (GPRs), floating-point registers (FPRs), fixed-point registers (FXPs), exception registers (XERs), condition registers (CRs), etc.).

In addition to creating a transient, logical-to-physical register mapper entry of an OoO instruction, unified main mapper 218 also keeps track of dependency data (i.e., instructions that are dependent upon the finishing of an older instruction in the pipeline), which is important for instruction ordering. Conventionally, once unified main mapper 218 has entered an instruction's logical-to-physical register translation, the instruction passes to issue queue 222. Issue queue 222 serves as the gatekeeper before the instruction is issued to execution unit 230 for execution. As a general rule, an instruction cannot leave issue queue 222 if it depends upon an older instruction to finish. For this reason, unified main mapper 218 tracks dependency data by storing the issue queue position data for each instruction that is mapped. Once the instruction has been executed by general execution engine 224, the instruction is said to have "finished" and is retired from issue queue 222.

Register management unit 214 may receive multiple instructions from dispatch unit 212 in a single cycle so as to maintain a filled, single issue pipeline. The dispatching of instructions is limited by the number of available entries in unified main mapper 218. In conventional mapper systems, which lack intermediate register mapper 220, if unified main mapper 218 has a total of 20 mapper entries, there is a maximum of 20 instructions that can be in flight (i.e., not check-pointed) at once. Thus, dispatch unit 212 of a conventional mapper system can conceivably "dispatch" more instructions than what can actually be retired from unified main mapper 218. The reason for this bottleneck at the unified main mapper 218 is due to the fact that, conventionally, an instruction's mapper entry could not retire from unified main mapper 218 until the instruction "completed" (i.e., all older instructions have "finished" executing).

According to one embodiment, intermediate register mapper 220 serves as a non-timing-critical register for which a "finished", but "incomplete" instruction from unified main mapper 218 could retire to (i.e., removed from unified main mapper 218) in advance of the instruction's eventual completion. Once the instruction "completes", completion unit 221 notifies intermediate register mapper 220 of the completion. The mapper entry in intermediate register mapper 220 can then update the architected coherent state of architected register mapper 216 by replacing the corresponding entry that was presently stored in architected register mapper 216.

When dispatch unit 212 dispatches an instruction, register management unit 214 evaluates the logical register number(s) associated with the instruction against mappings in architected register mapper 216, unified main mapper 218, and intermediate register mapper 220 to determine whether a match (commonly referred to as a "hit") is present in architected register mapper 216, unified main mapper 218, and/or intermediate register mapper 220. This evaluation is referred to as a logical register lookup. When the lookup is performed simultaneously at more than one register mapper (i.e., architected register mapper 216, unified main mapper 218, and/or intermediate register mapper 220), the lookup is referred to as a parallel logical register lookup.

In exemplary embodiments, a processor includes an instruction fetching unit for obtaining instructions from main storage, a predecode unit for decoding instructions, an instruction cache for storing decoded instructions, an issue queue for queuing instructions to be executed, execution units for executing function of instructions and a dispatch unit for dispatching instructions to respective execution units preferably in a pipeline. In embodiments, an issue queue, a predecode unit or a dispatch unit, for example, alone or in combination, may modify an instruction such that it does not have to be executed after a previous instruction.

In exemplary embodiments, the processor receives an instruction sequence that includes a first instruction and a second instruction, wherein the second instruction is configured to use the results of the execution of the first instruction in executing the second instruction. A test of the two instructions determines that they can be modified in order to produce instructions that can be executed more efficiently. For example, a first instruction sequence includes a first instruction "i0" and a second instruction "i1", and a sequence of multiple internal operations ("iops") that are improvements of the instruction sequence. For example, a producer instruction followed by a consumer instruction in program order (requiring in-order execution) might be optimized to create iop0 corresponding to the producer instruction and iop1 corresponding to the consumer instruction, where iop0 and iop1 can be executed out-of-order.

Figure 3:
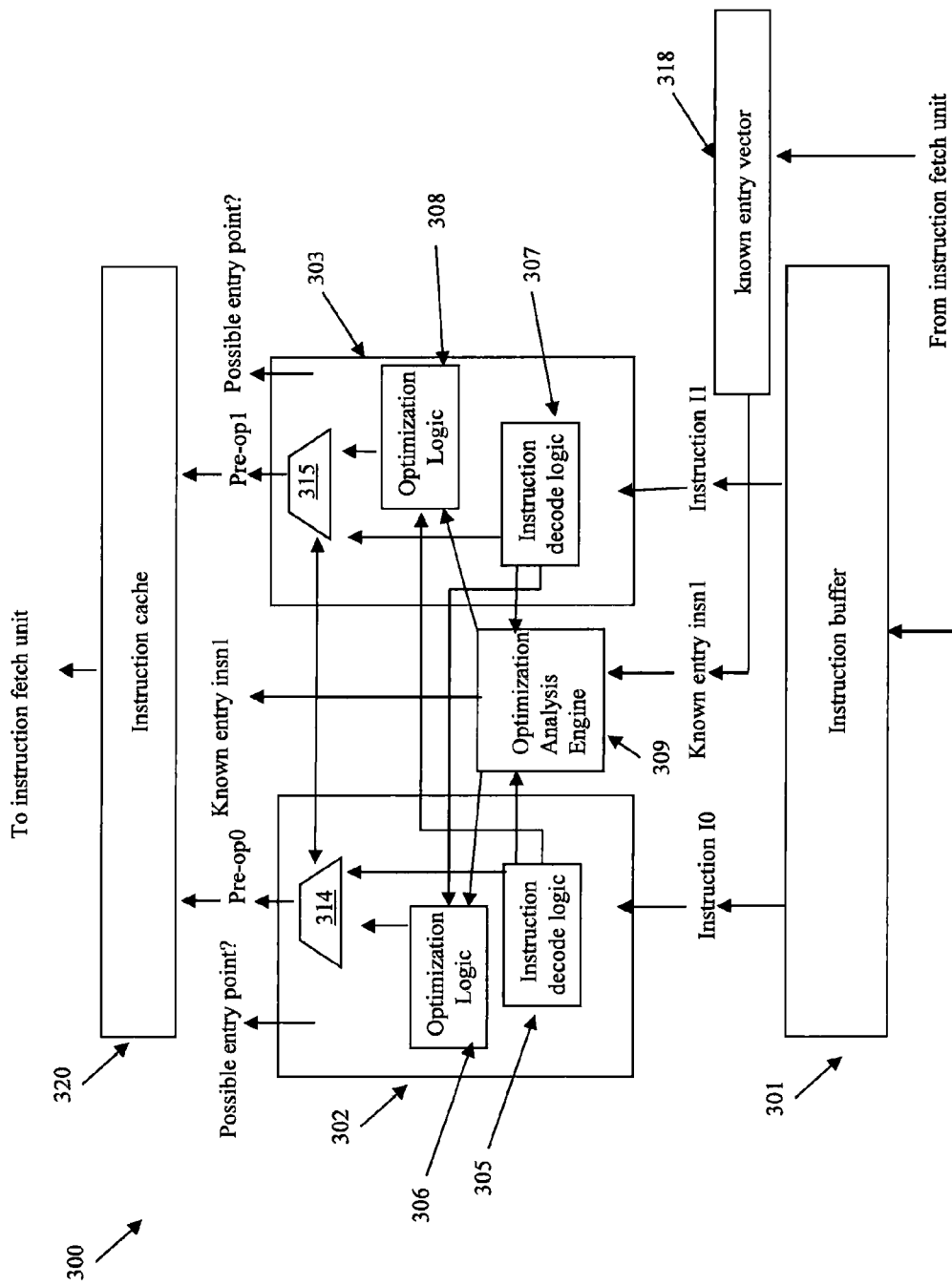
FIG. 3 depicts an example instruction optimization analysis engine environment in accordance with an embodiment.

Referring now to FIG. 3, an block diagram of a system 300 for performing predecode-time optimized instructions in conjunction with predecode time optimized instruction sequence caching in accordance with an exemplary embodiment is shown. The system 300 includes a first decoder 302 that receives a first instruction I0 from an instruction buffer 301 and a second decoder 303 that receives a second instruction I1 from the instruction buffer 301. In exemplary embodiments, the instruction buffer 301 may receive instructions from next level cache or system memory. The decoders 302, 303 perform initial decoding of the instructions and provide information regarding the instructions to an optimization analysis engine (OAE) 309. In exemplary embodiments, the information provided by the decoders 302, 303 to the OAE 309 can include operand and instruction information and operand resources properties. The decoders 302, 303 include instruction decode logic 305, 307 which generate an initial decoded iop representation for the first and second instruction corresponding to iop0 and iop1 when no optimization takes place.

In exemplary embodiments, the OAE 309 compares the decoded characteristics of the instructions received from decoders 302 and 303 to determine whether the instructions are candidates for optimization. In accordance with one embodiment, the OAE 309 may also be responsive to a plurality of control signals, to suppress the recognition of compound sequences, e.g., when a configuration bit is set. In exemplary embodiments, the OAE 309 can be a single entity as shown in FIG. 3, or can be replicated, distributed, split or otherwise integrated in one or more of decoders 302 and 303, and the OAE 309 can be combined in a single large compound decoder, e.g., including but not limited to a complex decoder comprising the OAE 309, decoder 302 and decoder 303 in a single structure, to facilitate logic optimization and circuit design improvements.

The OAE 309 provides information indicating whether a sequence of instructions which can be optimized has been detected, as well as information about the nature of the sequence (i.e., which of a plurality of instruction, and specific properties of the sequence required by the decoder optimization logic to generate an optimized sequence) to the decoders 302, 303. The OAE 309 may provide information to the instruction optimization logic 306, 308 such as a decoded portion of an instruction sequence being optimized, register information, immediate fields and operation codes. In addition, the OAE 309 may provide selection information to selection logic 314, 315 for determining if the decoded instructions I0 or I1 should be used, or if an optimized instruction should be used. In exemplary embodiments, once the selection logic 314, 315 determines which instructions should be used the instructions iop0 and iop1 are stored in instruction cache 320.

In exemplary embodiments, the decoders 302, 303 capture a series of instructions from the instruction buffer. The decoders 302, 303 decode and optimize the instruction sequence and then store the decoded and optimized instruction sequence directly in the instruction cache. As used herein the term pre-op refers to a predecoded instruction that has been stored in the instruction cache. In exemplary embodiments, the pre-op may be an optimized and decoded instruction and may include predecoded information and preoptimized instruction sequence information. By decoding and optimizing the instruction sequence and storing the pre-ops directly in the instruction cache, the processor is able to avoid the additional cost associated with repeatedly performing decode time instruction optimization prior to execution of the instruction sequence.

In exemplary embodiments, the system 300 decodes and optimizes am instruction sequence during a predecode time as opposed to a decode time. For example, in the system shown FIG. 1B of U.S. patent application Ser. No. 11/743,699, which is hereby incorporated by reference in its entirety, the decode time instruction optimization is preformed during a predecode block shown on FIG. 1B-1 as opposed to the decode block shown on FIG. 1B-2. Since the dynamic instruction sequence may not be known during the predecode time, the optimization can be based on instruction segments.

In exemplary embodiments, the system 300 may also store possible entry points into the instruction cache 320, i.e., where an optimization has not changed two adjacent instructions such that a branch into middle of sequence would change program behavior. Furthermore, the system 300 may include a known entry point vector 318 which includes known entry points for each cache line. The known entry point vector 318 may be stored in the instruction cache 320 with predecoded instruction operations. In exemplary embodiments, the first instruction in an instruction sequence is always a known entry point, assuming that the instruction logic will not perform optimizations across a cache block boundary. In one embodiment, each time a re-optimization event is triggered, branch targets are added to known entry point vector 318.

Figure 4:
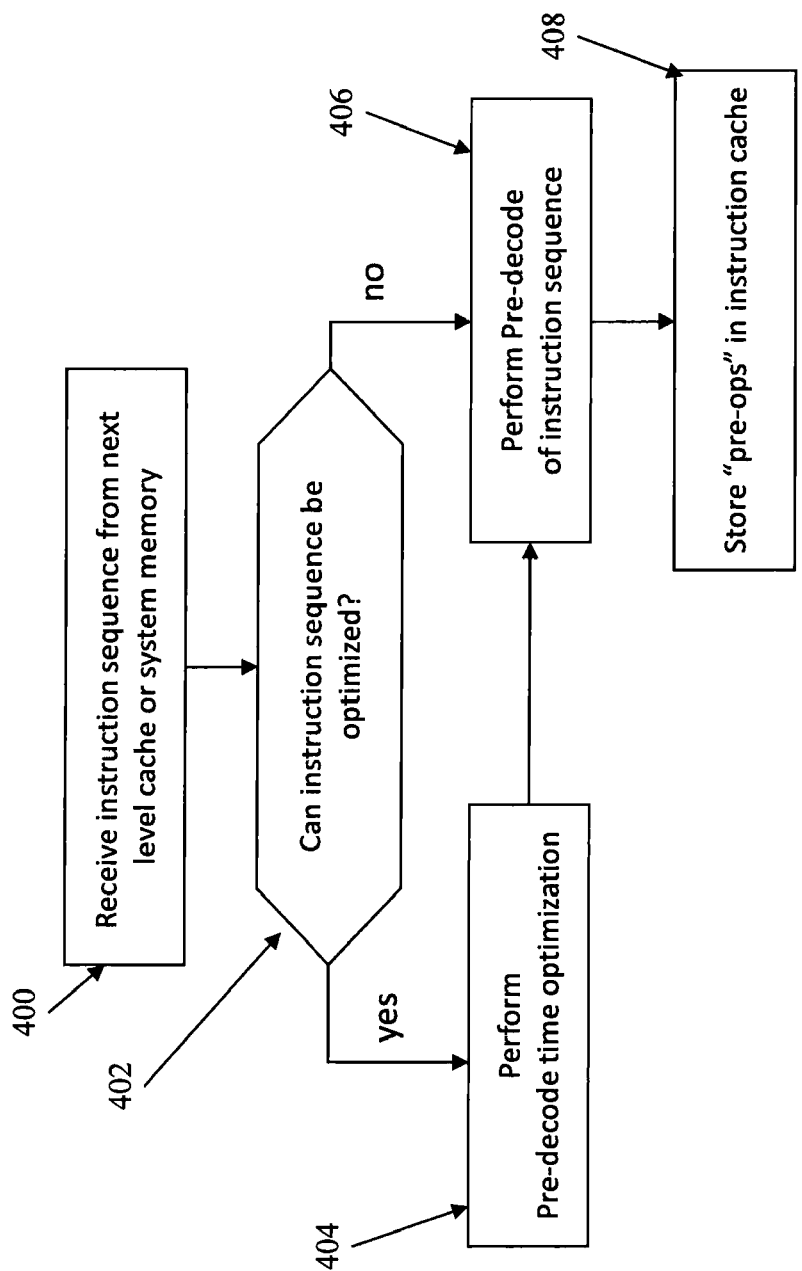
FIG. 4 is an example flowchart illustrating the operation of the optimization analysis engine of FIG. 3.

Referring now to FIG. 4, a flowchart showing a method for performing predecode-time optimized instructions in conjunction with predecode time optimized instruction sequence caching in accordance with an exemplary embodiment is shown. The method includes receiving instruction sequence from next level cache or system memory, as shown at block 400. At decision block 402, the method determines if the instruction sequence can be optimized. If the instruction sequence can be optimized, the method includes preforming pre-decode time optimization on the sequence of instructions, as shown at block 404. As shown at block 406, the method includes preforming a pre-decode of the instruction sequence. Finally, as shown at block 408, the pre-decoded instruction sequence is stored in instruction cache.

Figure 5:
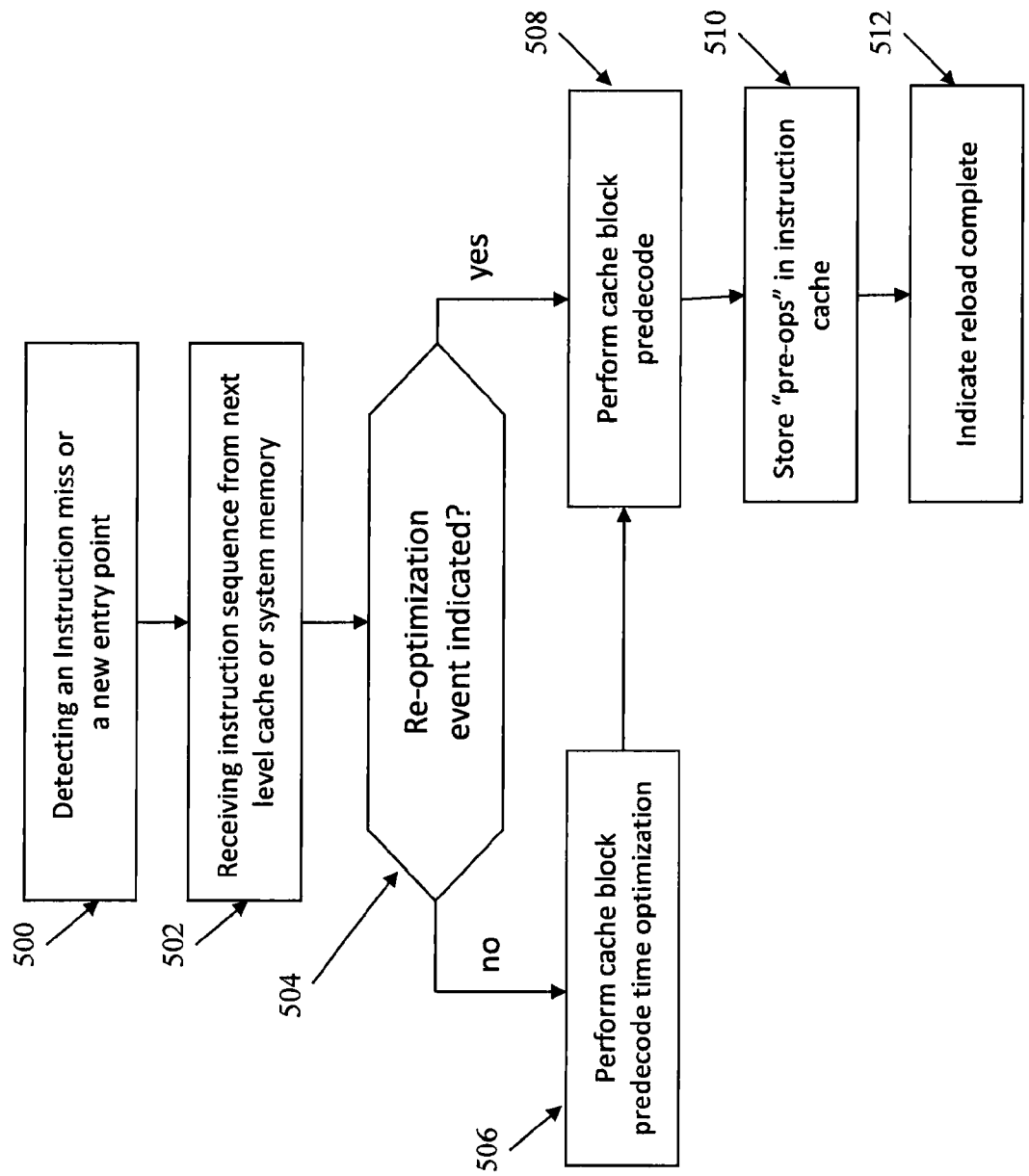
FIG. 5 is an example flowchart illustrating the operation of the optimization analysis engine of FIG. 3.

Turning now to FIG. 5, a flowchart showing another method for performing predecode-time optimized instructions in conjunction with predecode time optimized instruction sequence caching in accordance with an exemplary embodiment is shown. As shown at block 500, the method includes detecting an instruction miss or a new entry point. Next as shown at block 502, the method includes receiving instruction sequence from next level cache or system memory. At decision block 504, the method determines if a re-optimization event has been indicated. If a re-optimization event is not indicated, the method includes performing pre-decode time optimization on the instruction sequence, as shown at block 506. The method also includes performing a pre-decode on the instruction sequence, as shown at block 508. As shown at block 510, the method includes storing pre-ops in instruction cache. The method concludes by indicating that the reload of the instruction sequence in instruction cache was complete, as shown at block 512.

Figure 6:
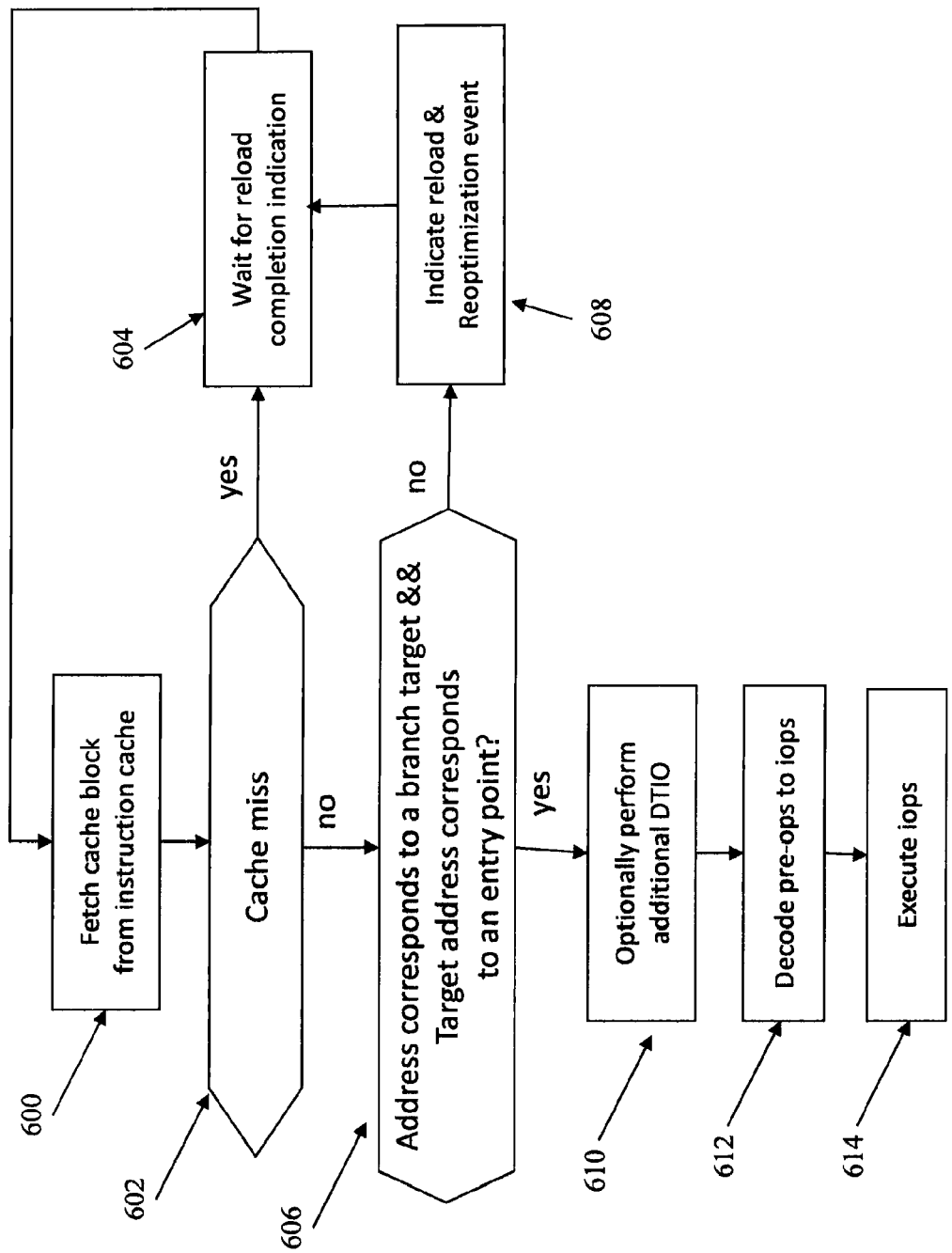
FIG. 6 is an example flowchart illustrating the operation of the optimization analysis engine of FIG. 3.

Referring now to FIG. 6, a flowchart showing another method for performing predecode-time optimized instructions in conjunction with predecode time optimized instruction sequence caching in accordance with an exemplary embodiment is shown. As shown at block 600, the method includes fetching a cache block, or pre-op segment, from the instruction cache. Next, as shown at decision block 602, the method includes determining if there was a cache miss in loading the cache block. If so, the method waits for an indication that a cache reload has completed, as shown at block 604. Otherwise, the method proceeds to decision block 606 and determines whether cache block address corresponds to a branch target and if the target address corresponds to a known entry point. If not, the method includes performing re-optimization notification and reload cache block (e.g. one of segment/subline/line), as shown at block 608. Otherwise, the method proceeds to block 610 and optionally perform additional DTIO optimizations. Next, as shown at block 612, the method includes decoding per-ops to iops. The method concludes at block 614 by executing the iops.

Those skilled in the art will appreciate that while the exemplary embodiments have been directed towards the detection of two-instruction sequences, and OAE may be connected to more than two decoders, and identify instruction sequences consisting of more than 2 instructions. Furthermore, the sequence of instructions may be separated by additional instructions in an embodiment.

In an embodiment, a pair of instructions are determined to be candidates for optimization, in order to be executed out-of-order by any one of a decode logic circuit, a dispatch logic circuit, an issue queue logic circuit or a cracking logic circuit operating on the instructions to be optimized. In another embodiment, an optimization circuit determines candidate instructions for optimization at or after an instruction decode circuit decodes the candidate instructions, and causes the optimized instruction to be effectively inserted in the pipeline rather than the original instruction being optimized.

Figure 7:
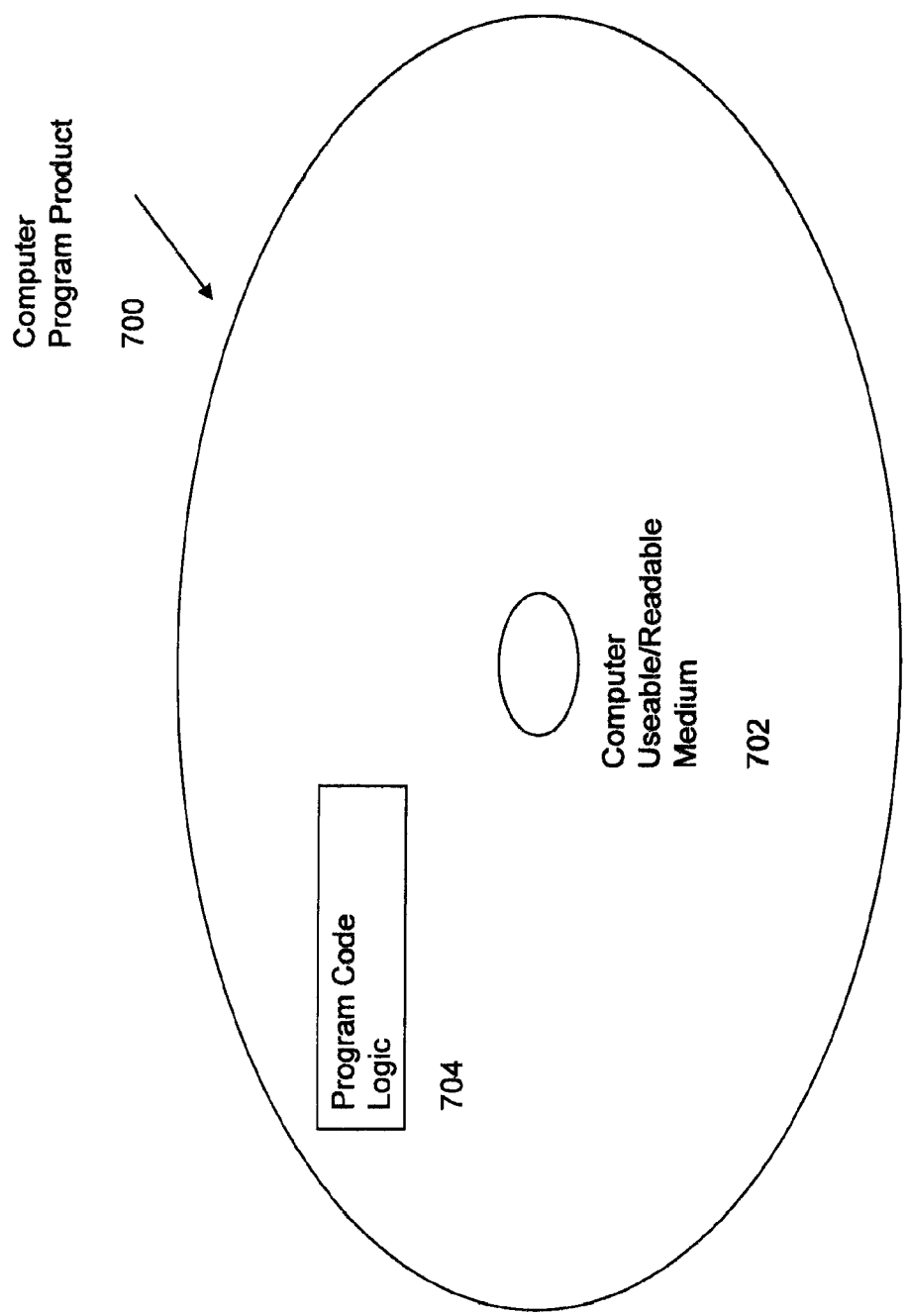
FIG. 7 illustrates a computer program product in accordance with an embodiment.

As described above, embodiments can be embodied in the form of computer-implemented processes and apparatuses for practicing those processes. An embodiment may include a computer program product 700 as depicted in FIG. 7 on a computer readable/usable medium 702 with computer program code logic 704 containing instructions embodied in tangible media as an article of manufacture. Exemplary articles of manufacture for computer readable/usable medium 702 may include floppy diskettes, CD-ROMs, hard drives, universal serial bus (USB) flash drives, or any other computer-readable storage medium, wherein, when the computer program code logic 704 is loaded into and executed by a computer, the computer becomes an apparatus for practicing the invention. Embodiments include computer program code logic 704, for example, whether stored in a storage medium, loaded into and/or executed by a computer, or transmitted over some transmission medium, such as over electrical wiring or cabling, through fiber optics, or via electromagnetic radiation, wherein, when the computer program code logic 704 is loaded into and executed by a computer, the computer becomes an apparatus for practicing the invention. When implemented on a general-purpose microprocessor, the computer program code logic 704 segments configure the microprocessor to create specific logic circuits.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for performing predecode-time optimized instructions in conjunction with predecode time optimized instruction sequence caching, the system comprising:

a processor configured to communicate with a main storage, the processor comprising an instruction fetcher, an instruction modifier, an instruction cache, wherein the instruction cache is a level one cache, and one or more execution units, the processor configured to:

receive, from the instruction cache, a first instruction of an instruction sequence by a first decoder and a second instruction of the instruction sequence by a second decoder;

decode the first instruction of an instruction sequence by the first decoder to create a decoded first instruction;

decode the second instruction of the instruction sequence by the second decoder to create a decoded second instruction determine, by a optimization analysis engine in communication with the first decoder and the second decoder, if the first instruction and the second instruction can be optimized based on the decoded first instruction and the second decoded instruction;

responsive to the determining that the first instruction and second instruction can be optimized, the processor is further configured to:

perform a optimization on the instruction sequence and generate by the second decoder a new decoded second instruction, wherein the new decoded second instruction is not dependent on a target operand of the first instruction; and store the decoded first instruction and the new decoded second instruction directly in the instruction cache;

responsive to the determining that the first instruction and second instruction can not be optimized, the processor is further configured to:

store the decoded first instruction and the decoded second instruction directly in the instruction cache; and store an entry point in an entry point vector stored in the instruction cache, the entry point corresponding to the decoded first instruction.

2. The system of claim 1, wherein the new decoded second instruction specifies the source operand locations of the first instruction and at least one source operand location of the second instruction.

3. The system of claim 1, wherein the target operand location is a first target register of the first instruction and the source operand location is a source register of the second instruction.

* * * * *